United States Patent
Gou et al.

(10) Patent No.: US 12,028,165 B2
(45) Date of Patent: Jul. 2, 2024

(54) HARQ-ACK CODEBOOK DETERMINATION METHOD AND APPARATUS, TERMINAL, AND STORAGE MEDIUM

(71) Applicant: ZTE CORPORATION, Shenzhen (CN)

(72) Inventors: Wei Gou, Shenzhen (CN); Peng Hao, Shenzhen (CN); Chenchen Zhang, Shenzhen (CN); Min Ren, Shenzhen (CN)

(73) Assignee: ZTE Corporation, Guangdong (CN)

( * ) Notice: Subject to any disclaimer, the term of this patent is extended or adjusted under 35 U.S.C. 154(b) by 484 days.

(21) Appl. No.: 17/290,878

(22) PCT Filed: Nov. 1, 2019

(86) PCT No.: PCT/CN2019/115148
§ 371 (c)(1),
(2) Date: May 3, 2021

(87) PCT Pub. No.: WO2020/088676
PCT Pub. Date: May 7, 2020

(65) Prior Publication Data
US 2021/0391956 A1     Dec. 16, 2021

(30) Foreign Application Priority Data
Nov. 2, 2018   (CN) .......................... 201811303662.0

(51) Int. Cl.
*H04L 1/1812*   (2023.01)
*H04L 1/1867*   (2023.01)
(Continued)

(52) U.S. Cl.
CPC .......... *H04L 1/1819* (2013.01); *H04L 1/1896* (2013.01); *H04W 72/0446* (2013.01); *H04W 72/23* (2023.01); *H04W 72/56* (2023.01)

(58) Field of Classification Search
None
See application file for complete search history.

(56) References Cited

U.S. PATENT DOCUMENTS

2018/0279266 A1    9/2018  Li et al.
2021/0176011 A1*   6/2021  Lei .................. H04L 1/1896
(Continued)

FOREIGN PATENT DOCUMENTS

CN    106549734 A    3/2017
CN    108282879 A    7/2018
(Continued)

OTHER PUBLICATIONS

Ericsson: "On remaining issues on carrier aggregation", 3GPP TSG RAN WG1 Meeting #92, Athens, Greece, Feb. 26-Mar. 2, 2018. pp. 1-16.
(Continued)

*Primary Examiner* — Srinivasa R Reddivalam
(74) *Attorney, Agent, or Firm* — BOND, SCHOENECK & KING, PLLC; George R. McGuire

(57) ABSTRACT

Provided are an HARQ-ACK codebook determination method and apparatus, a terminal and a storage medium. The method includes: dividing candidate PDSCHs in at least one slot into groups according to candidate PDSCH types and end times of the candidate PDSCHs, and forming pieces of HARQ-ACK information corresponding to the divided candidate PDSCHs; and concatenating the pieces of HARQ-ACK information corresponding to the candidate PDSCHs to obtain an HARQ-ACK codebook.

11 Claims, 5 Drawing Sheets

---

Divide all candidate PDSCHs into groups according to candidate PDSCH types and end times of the candidate PDSCHs, and form pieces of corresponding HARQ-ACK information — S301

Concatenating the pieces of HARQ-ACK information corresponding to all the candidate PDSCHs to obtain a codebook — S302

(51) Int. Cl.
*H04W 72/0446* (2023.01)
*H04W 72/23* (2023.01)
*H04W 72/56* (2023.01)

(56) References Cited

U.S. PATENT DOCUMENTS

| | | | |
|---|---|---|---|
| 2021/0203451 A1* | 7/2021 | Lei | H04L 1/1854 |
| 2021/0226759 A1* | 7/2021 | Takeda | H04L 5/0055 |
| 2021/0266105 A1* | 8/2021 | Lei | H04W 28/04 |

FOREIGN PATENT DOCUMENTS

| | | |
|---|---|---|
| WO | 2017045499 A1 | 3/2017 |
| WO | 2018126777 A1 | 7/2018 |

OTHER PUBLICATIONS

Samsung: "Corrections on HARQ Feedback", 3GPP TSG RAN WG1 #AH 1801, Vancouver, Canada, Jan. 22-26, 2018. pp. 1-9.
European Search Report, dated Jun. 15, 2022. pp. 1-8.
Translated CN First Search Report. p. 1 of 1.
CN First Search Report, pp. 1-12.
Translated CN First Office Action, pp. 1-7.
CN Office Action, pp. 1-9.
3GPP TSG RAN WG1 Meeting #89 R1-1708025 Hangzhou, P.R. China May 15-19, 2017 Agenda item: 7.1.3.3.3 Source: Samsung Title: HARQ-ACK codebook determination pp. 1-4.
ZTE. "URLLC/eMBB differentiation and enhancement to semi-statuc ACK/NACK codebook, R1-1812391" 3GPP TSG RAN WGl Meeting #95, Nov. 3, 2018 (Nov. 3, 2018), sections 1-3.
Nokia et al. "Remaining aspects of NR CA, R1-1806144" 3GPP TSG RAN WGI Meeting #93, May 25, 2018 (May 25, 2018), sections 1-3.
Samsung, "Corrections on CA operation, R1-1801989" 3GPP TSN RAN WGI Meeting #92, Mar. 2, 2018 (Mar. 2, 2018), sections 1-3.
ZTE. "URLLC PHY enhancements, R1-1810348" 3GPP TSG RAN WGI Meeting #94bis, Oct. 12, 2018 (Oct. 12, 2018) sections 1-3.
International Search Report Form PCT/ISA/210, and Written Opinion Form PCT/ISA/237, International Application No. PCT/CN2019/115148 pp. 1-7 International Filing Date Nov. 1, 2019 dated Feb. 3, 2020.
Vivo "DL intra UE Tx prioritization for URLLC" 3GPP TSG RAN WG1 Meeting #94bis, Chengdu, China, Oct. 8-12, 2018. pp. 1-4.
Translated KR Office Action, dated Apr. 27, 2023. pp. 1-5.

* cited by examiner ical field of 5G communications and, in particular, relate to, but are not limited to, a hybrid automatic repeat request-acknowledgement (HARQ-ACK) codebook determination method and apparatus, a terminal, and a computer-readable storage medium.

BACKGROUND

In the 5th generation mobile communication system (5G), there is a limitation for determining the size of a static codebook: if a user equipment (UE) is configured with positions of multiple transmitted physical downlink shared channel (PDSCH) candidates in one slot, then for positions of transmitted candidate PDSCHs which overlap each other in time domain, the UE determines only one piece of HARQ-ACK information in a semi-static HARQ-ACK codebook.

This limitation also means that for the preceding candidate PDSCHs overlapping each other in time domain, a base station can schedule and transmit only one candidate PDSCH. For example, in FIGS. 1A and 1B, for a UE, positions of two transmitted candidate PDSCHs are configured in one slot, but there is an overlap between the two transmitted candidate PDSCHs in time domain (that is, an overlap in a lateral direction of FIG. 1). In this case, when the base station schedules a PDSCH, only one candidate PDSCH among the two transmitted candidate PDSCHs can be scheduled and transmitted, and the UE also forms, for only the one PDSCH, one piece of HARQ-ACK information in a semi-static codebook.

However, in view to supporting ultra-reliable and low latency communication (URLLC) traffic with a low latency and a high reliability, puncturing transmission as a scheme candidate is discussed, that is, downlink PDSCH multiplexing transmission intra a UE. For example, FIGS. 2A and 2B illustrate that positions of two candidate PDSCHs are in one slot. In FIG. 2A, a position of PDSCH1 candidate is first used for transmitting enhance mobile broadband (eMBB) traffic. However, URLLC traffic that needs to be immediately transmitted occurs suddenly during the transmission, and then, the base station performs transmission in the position of PDSCH2. In this case, in an overlapping position between PDSCH1 and PDSCH2 in time domain, since the URLLC traffic has a higher priority, the transmission of PDSCH1 is prohibited in the time domain position corresponding to PDSCH2, while the transmission of PDSCH2 is performed in the overlapping position in time domain. The transmission of PDSCH1 can be continued in a non-overlapping position in time domain. In this way, PDSCH1 is punctured by PDSCH2. Some data in PDSCH1 is punctured, thereby being not transmitted or received by the UE. In FIG. 2B, the case is similar, except that the PDSCH1 candidate and PDSCH2 candidate overlap each other not only in time domain but also in frequency domain. Similarly, the transmission of PDSCH1 is prohibited in an overlapping position (that is, actually, an overlapping orthogonal frequency division multiplexing (OFDM) symbol) in time domain.

A semi-static codebook mechanism in the related art is unreasonable for the transmission modes in FIGS. 2A and 2B since the semi-static codebook mechanism feeds back only one piece of HARQ-ACK information in a slot. Actually, two PDSCHs are transmitted in the slot here, but one PDSCH is punctured. Although there may be a possibility of being correctly decoded (codec gains) in the actual situation, this is only a very small probability after all.

SUMMARY

Embodiments of the present disclosure provide an HARQ-ACK codebook determination method and apparatus, a terminal and a storage medium, to solve the issue that in the determination of a static codebook, only one of multiple candidate PDSCHs configured in the same slot can be selected to form a codebook and thus data is not transmitted.

An embodiment of the present disclosure provides an HARQ-ACK codebook determination method. The method includes the steps described below.

Candidate PDSCHs in at least one slot are divided into groups according to candidate PDSCH types and end times of the candidate PDSCHs, and pieces of HARQ-ACK information corresponding to the divided candidate PDSCHs are formed.

The pieces of HARQ-ACK information corresponding to the candidate PDSCHs are concatenated to obtain an HARQ-ACK codebook.

An embodiment of the present disclosure further provides an HARQ-ACK codebook determination apparatus. The apparatus includes a configuration module and a conversion module.

The configuration module is configured to divide candidate PDSCHs in at least one slot into groups according to candidate PDSCH types and end times of the candidate PDSCHs, and form pieces of HARQ-ACK information corresponding to the divided candidate PDSCHs.

The conversion module is configured to concatenate the pieces of HARQ-ACK information corresponding to the candidate PDSCHs to obtain an HARQ-ACK codebook.

An embodiment of the present disclosure further provides a terminal. The terminal includes a processor, a memory, a communication unit and a communication bus.

The communication bus is configured to implement communication connection between the processor, the communication unit and the memory.

The processor is configured to execute one or more programs stored in the memory, to implement the HARQ-ACK codebook determination method described above.

An embodiment of the present disclosure further provides a computer-readable storage medium. The computer-readable storage medium stores one or more computer programs executable by one or more processors to implement the HARQ-ACK codebook determination method described above.

According to the HARQ-ACK codebook determination method and apparatus, the terminal and the computer-readable storage medium in the embodiments of the present disclosure, all candidate PDSCHs in a slot are divided into groups according to candidate PDSCH types and end times of the candidate PDSCHs, a corresponding piece of HARQ-ACK information is formed for each group of PDSCHs according to the group division situation, and finally, the formed pieces of HARQ-ACK information are concatenated according to a sequence of the end times, to obtain a final codebook. The HARQ-ACK information obtained after the concatenation is a definite and complete codebook. In this way, when multiple candidate PDSCHs are configured in the same slot and have an overlap in time domain, it can be ensured that the issue that a part of the candidate PDSCHs are forbidden to be used in puncturing transmission does not occur. Moreover, the codebook determined by the method has a moderate size and the integrity of data transmission can be ensured, thereby improving the use performance of a device.

DETAILED DESCRIPTION

To make the objects, schemes and advantages of the present disclosure clearer, the embodiments of the present disclosure are described below in more detail in conjunction with the specific implementations and drawings. It is to be understood that the embodiments described herein are merely intended to explain the present application and are not to limit the present application.

Embodiment One

In the related art, when multiple candidate PDSCHs are configured in the same slot, due to an overlap in time domain, only one candidate PDSCH is selected from the candidate PDSCHs having the overlap in time domain in practical use. In this way, a part of the candidate PDSCHs may be prohibited, thereby affecting the integrity of data transmission. In practical application, configured candidate PDSCHs may be used for transmission of different traffic types. In view of this issue, an embodiment of the present disclosure provides a codebook determination method. In the method, pieces of HARQ-ACK information are divided and concatenated (concatenation refers to concatenating the pieces of HARQ-ACK information at a bit level, also referred to as multiplexing, that is, the pieces of HARQ-ACK information are multiplexed together at the bit level and serve as an HARQ-ACK codebook) according to candidate PDSCH types and end times of configured candidate PDSCHs. Thus, in the same slot, even candidate PDSCHs having an overlap may be configured with an HARQ-ACK codebook as long as the candidate PDSCHs have different traffic types, thereby implementing data transmission.

Figure 1A:
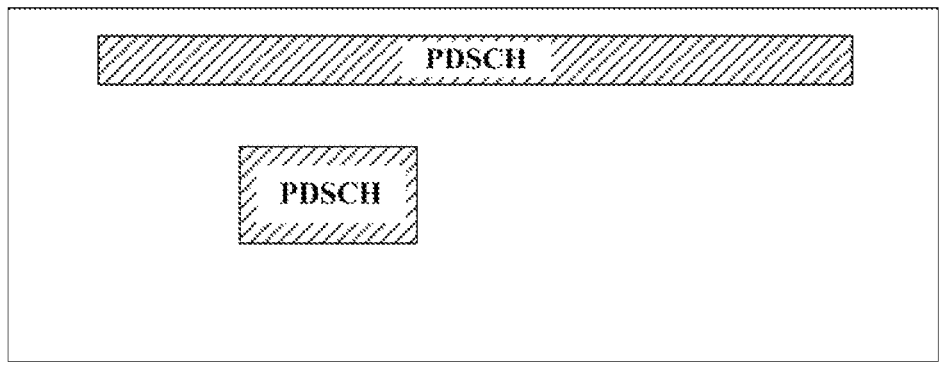
FIG. 1A is a schematic diagram illustrating that multiple candidate PDSCHs configured in the same slot have an overlap in time domain according to the related art.
Figure 1B:
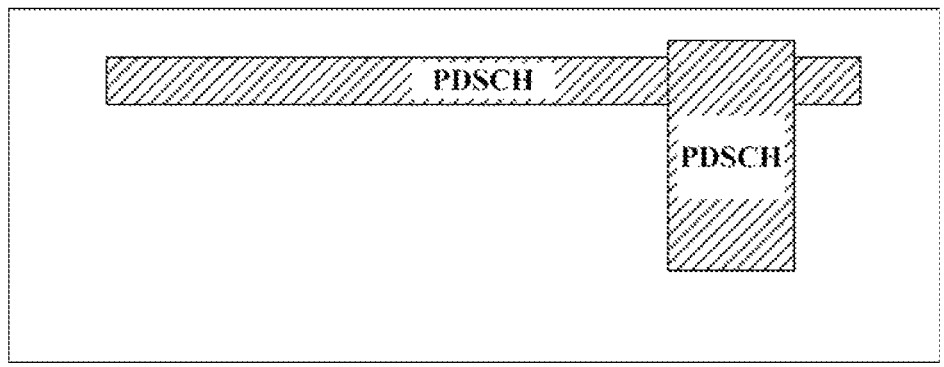
FIG. 1B is another schematic diagram illustrating that multiple candidate PDSCHs configured in the same slot have an overlap in time domain according to the related art.
Figure 2A:
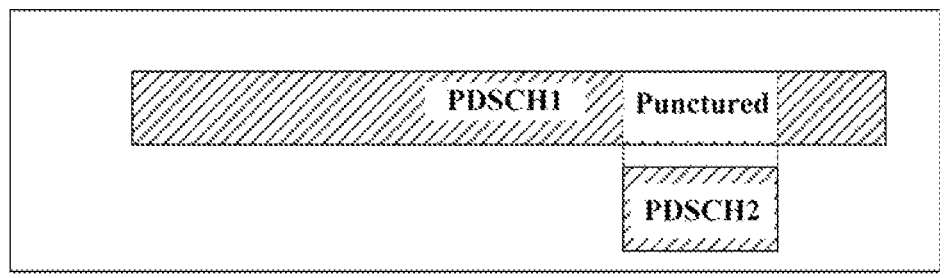
FIG. 2A is a schematic diagram of a multiplexing transmission of multiple candidate PDSCHs configured in the same slot according to the related art.
Figure 2B:
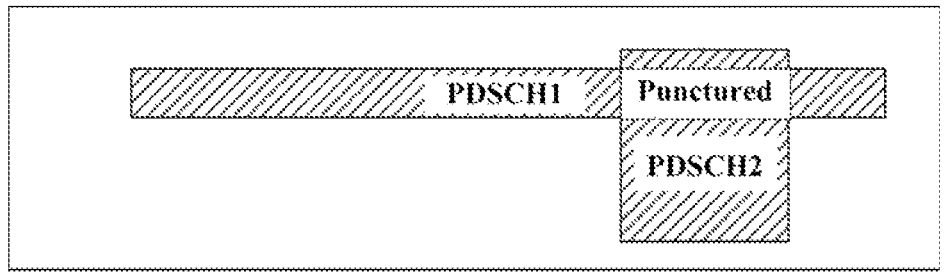
FIG. 2B is a schematic diagram of another multiplexing transmission of multiple candidate PDSCHs configured in the same slot according to the related art.
Figure 3:
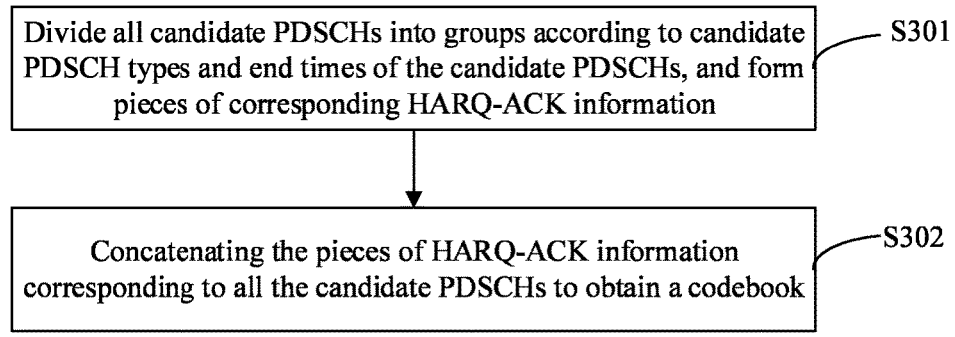
FIG. 3 is a flowchart of a codebook determination method according to an embodiment of the present disclosure.

Referring to FIG. 3, the codebook determination method includes the steps described below.

In step 301, candidate PDSCHs in at least one slot are divided into groups according to candidate PDSCH types and end times of the candidate PDSCHs, and pieces of HARQ-ACK information corresponding to the divided candidate PDSCHs are formed.

In practical application, the candidate PDSCH types are also types corresponding to traffic. According to the types of traffic transmitted by the candidate PDSCHs, the candidate PDSCH types may be used for distinguishing the types corresponding to the candidate PDSCHs in the slot and distinguishing the positions where the candidate PDSCHs are located in the slot. That is, the candidate PDSCH types are the types of the served traffic. In the configuration of candidate PDSCHs in a slot, different candidate PDSCHs are configured according to different types of traffic, and candidate PDSCHs corresponding to different traffic occupy different numbers of consecutive symbols. Therefore, a traffic type and a priority of a traffic type here correspond to a candidate PDSCH type. If the traffic has a high priority, a corresponding candidate PDSCH type has a high priority.

In this step, all the candidate PDSCHs may be divided into groups in the two manners described below.

Manner one: First, all the candidate PDSCHs are classified according to the candidate PDSCH types, and different candidate PDSCH sets are formed. Then, a codebook is formed for candidate PDSCHs in each set separately. The codebook here is a semi-static HARQ-ACK codebook (hereinafter also referred to as a semi-static codebook or a codebook). In the forming of the semi-static codebook, the candidate PDSCHs in each set and having an overlap in time domain are first divided into groups, and a respective piece of HARQ-ACK information is formed for each group.

Manner two: All the candidate PDSCHs are divided into groups according to a sequence of end times. Then, a respective piece of HARQ-ACK information is formed for each group. In the group division according to the end times, candidate PDSCHs of the same traffic type should be considered to be grouped into the same group. Finally, HARQ- ACK information is formed by concatenation according to the sequence of the end times of the divided candidate PDSCHs.

In step S302, the pieces of HARQ-ACK information corresponding to all the candidate PDSCHs are concatenated to obtain a codebook.

In this step, in the arrangement and concatenation may be performed in the following manner: first, the candidate PDSCH types corresponding to the candidate PDSCHs are sequenced according to priorities; on the basis of the sequence of the priorities, the pieces of HARQ-ACK information are sequentially concatenated from high to low priority to obtain a complete codebook. The total length of the codebook is the length of the pieces of HARQ-ACK information corresponding to all the groups.

In this embodiment, in the determination of the codebook according to the method, a processing may be performed according to the actual number of slots. If the at least one slot is one slot, the step in which the candidate PDSCHs in the at least one slot are divided into the groups according to the candidate PDSCH types and the end times of the candidate PDSCHs, and the pieces of corresponding HARQ-ACK information are formed includes that: priorities of pieces of traffic to be transmitted are determined, all the candidate PDSCHs are divided into at least two candidate PDSCH sets according to the candidate PDSCH types; and candidate PDSCHs in a candidate PDSCH set corresponding to the same candidate PDSCH type are divided into subgroups according to a sequence of end times of the candidate PDSCHs in the candidate PDSCH set, and HARQ-ACK information corresponding to a PDCSH candidate in each subgroup is formed.

Further, candidate PDSCHs with the same priority may be divided in the following manners: a first candidate PDSCH with the earliest end time is determined from the candidate PDSCH set corresponding to the candidate PDSCH type; a second candidate PDSCH having an overlap with the first candidate PDSCH in time domain is determined from remaining candidate PDSCHs in the candidate PDSCH set; and the first candidate PDSCH and the second candidate PDSCH are grouped into one subgroup.

After the first candidate PDSCH and the second candidate PDSCH are grouped, the remaining candidate PDSCHs except the first candidate PDSCH and the second candidate PDSCH in the candidate PDSCH set corresponding to the same candidate PDSCH type need to be divided into groups again. The implementation is the same as the group division manner of the first candidate PDSCH and the second candidate PDSCH.

The group division manner is that all candidate PDSCHs in one slot are first divided into large categories according to traffic types, and then, candidate PDSCHs of each large category are divided. The division based on each large category is performed according to the overlapping situation in time domain and end time of each candidate PDSCH.

In this embodiment, the candidate PDSCHs in one slot may be divided in the following manner: the step in which the candidate PDSCHs in the at least one slot are divided into the groups according to the candidate PDSCH types and the end times of the candidate PDSCHs, and the pieces of HARQ-ACK information corresponding to the divided candidate PDSCHs are formed includes that: the end times of all the candidate PDSCHs are determined, a third candidate PDSCH with the earliest end time is selected from the candidate PDSCHs in the at least one slot, a candidate PDSCH type of the third candidate PDSCH is determined, a fourth candidate PDSCH having an overlap with the third candidate PDSCH in time domain is determined from other candidate PDSCHs corresponding to the candidate PDSCH type, and the third candidate PDSCH and the fourth candidate PDSCH are grouped into one subgroup.

After the third candidate PDSCH and the fourth candidate PDSCH are grouped, the remaining candidate PDSCHs except the third candidate PDSCH and the fourth candidate PDSCH in the slot need to be divided into groups again. The implementation is the same as the group division manner of the third candidate PDSCH and the fourth candidate PDSCH.

That is, the group division manner is that a candidate PDSCH is first determined according to the end times of the candidate PDSCHs, and then corresponding candidate PDSCHs are selected according to the traffic type corresponding to the determined candidate PDSCH to perform the time-domain overlap selection. That is, candidate PDSCHs of the same traffic type are grouped into the same group.

Further, in the manner of dividing groups according to the end times first, if at least two third candidate PDSCHs each with the earliest end time are determined from all the candidate PDSCHs, the step in which all the candidate PDSCHs in the at least one slot are divided into the groups according to the candidate PDSCH types and the end times of the candidate PDSCHs, and the pieces of corresponding HARQ-ACK information are formed further includes: the at least two third candidate PDSCHs are sequenced according to priorities of the candidate PDSCH types, and one candidate PDSCH with a higher priority is selected from the sequenced at least two third candidate PDSCHs as an actual third candidate PDSCH. The step is configured after the candidate PDSCH type of the third candidate PDSCH is determined and before the fourth candidate PDSCH having an overlap with the third candidate PDSCH in time domain is determined from other candidate PDSCHs corresponding to the candidate PDSCH type.

On the basis of the preceding division, the step in which the pieces of HARQ-ACK information corresponding to all the candidate PDSCHs are concatenated to obtain the codebook includes that: all the candidate PDSCHs in the at least one slot are sequentially concatenated from high to low priority according to a sequence of the priorities of the candidate PDSCH types to form the corresponding complete codebook.

In this embodiment, if the at least one slot is more than two slots, the step in which all the candidate PDSCHs are divided into the groups according to the candidate PDSCH types and the end times of the candidate PDSCHs, and the pieces of corresponding HARQ-ACK information are formed includes that: a priority of each candidate PDSCH in each slot is determined according to traffic transmitted by the candidate PDSCH types; and HARQ-ACK information for candidate PDSCHs in each priority is formed in the following manner: a candidate PDSCH with the earliest end time is selected from the candidate PDSCHs with the same priority as a fifth candidate PDSCH; a sixth candidate PDSCH having an overlap with the fifth candidate PDSCH in time domain is determined from remaining candidate PDSCHs among the candidate PDSCHs with the same priority; and the fifth candidate PDSCH and the sixth candidate PDSCH are grouped into one subgroup, and corresponding HARQ-ACK information is formed.

In this case, the step in which the pieces of HARQ-ACK information corresponding to all the candidate PDSCHs are concatenated to obtain the codebook is implemented in the manners described below.

Manner A: All candidate PDSCHs in each slot are sequentially concatenated from high to low priority according to a sequence of the priorities of the candidate PDSCH types; and HARQ-ACKs of the concatenated candidate PDSCHs are concatenated to form a corresponding complete HARQ-ACK codebook according to a time sequence of the at least two slots.

Specifically, HARQ-ACKs of all candidate PDSCHs with a higher priority are sequentially concatenated before HARQ-ACKs of all candidate PDSCHs with a lower priority according to the sequence of the priorities of the candidate PDSCH types to form the HARQ-ACK codebook.

Manner B: HARQ-ACKs of all candidate PDSCHs in each slot are first sequentially concatenated from high to low priority according to the sequence of the priorities of the candidate PDSCH types; and then, the concatenated HARQ-ACKs are concatenated according to a time sequence of the slots to form the HARQ-ACK codebook.

HARQ-ACKs of the candidate PDSCHs with the same priority are concatenated according to a time sequence. That is, when the candidate PDSCHs with the same priority are divided into groups in the preceding manners A and B, it is still necessary to perform a concatenation according to end times of the candidate PDSCHs to obtain HARQ-ACKs of all the candidate PDSCHs with the priority.

In this embodiment, before the step S301, the method further includes a step in which the candidate PDSCH types in the slot are identified. The candidate PDSCHs in the slot may be distinguished in the following manner: the candidate PDSCH types are determined by identifying configuration signaling of each candidate PDSCH in the slot; or the candidate PDSCH types are determined by identifying a number of consecutive symbols occupied by each candidate PDSCH in the slot.

In this embodiment, the configuration signaling includes a radio resource control (RRC) message, or parameter information in downlink control information (DCI), or a radio network temporary identifier type used in DCI, or a cyclic redundancy code type. Here, the following manner is adopted: candidate PDSCH sets are configured through different RRC messages, and an HARQ-ACK codebook is determined for a candidate PDSCH set configured through each RRC message separately (that is, the candidate PDSCH set configured through each RRC message has one candidate PDSCH type); or a total candidate PDSCH set is configured through an RRC message, and then, an RRC parameter is used for indicating that, or it is agreed that a part of candidate PDSCHs in the total candidate PDSCH set corresponds to one PDSCH type and another part of candidate PDSCHs corresponds to another PDSCH type.

In practical application, the candidate PDSCHs in the slot may generally correspond to the following two types of traffic: URLLC traffic and EMBB traffic. When for these two types of traffic, the manner of steps S301 to S303 described above is adopted, the specific process is described below.

The URLLC traffic has some features. For example, a PDSCH of URLLC generally has less consecutive symbols and, typically, has 1, 2 or 4 symbols. That is, according to a specific feature of the URLLC transmission, there is a typical upper limit value of the number of symbols used by the PDSCH of URLLC. The value is assumed to be M. To reasonably account for the size of the codebook without introducing additional overheads, it is assumed hereinafter that positions of possible candidate PDSCHs of URLLC can be distinguished.

For these two types of traffic, the candidate PDSCHs in the slot are first distinguished to determine which candidate PDSCHs are used for the transmission of the URLLC traffic and which candidate PDSCHs are used for the transmission of the EMBB traffic. The distinguishing manner may include one of the manners described below.

1) Explicit signaling notification: Positions of candidate PDSCHs are configured for URLLC by using dedicated signaling. Certainly, to avoid wasting resources, these positions may allow the eMBB transmission when there is no URLLC traffic, but once there is URLLC, these resources are preferentially used. Alternatively, the distinguishing is performed through a scheduled DCI type or a part of parameters in DCI. In this case, a UE may also learn which PDSCH positions are used for transmitting URLLC.

The manner of configuration signaling may include one of the following manners: a separate set of positions of possible candidate PDSCHs are configured for URLLC traffic through an RRC message; a parameter is used for indicating which positions of candidate PDSCHs in the set of positions of candidate PDSCHs configured for the UE are positions of candidate PDSCHs on which URLLC may be transmitted.

However, in practical application, in the set of possible candidate PDSCHs of URLLC, if URLLC is not transmitted, the candidate PDSCHs may be used for transmitting eMBB. Generally, an RRC message or a DCI parameter indicates that the configured candidate PDSCHs are preferentially used for URLLC traffic.

2) The distinguishing is performed according to agreed numbers of consecutive symbols. That is, the position of each candidate PDSCH with M consecutive symbols or less than M consecutive symbols is regarded as a PDSCH position on which URLLC may be transmitted and should be considered in the forming of a semi-static codebook. M may have different values according to different subcarrier spacings. For example, when the subcarrier spacing is 15 KHz, M is 2; when the subcarrier spacing is 30 KHz, M is 4; when the subcarrier spacing is 60 KHz, M is 8. The values given here are merely possible values. Actually, the values may be different from the values given here, but need to be agreed values. Similarly, to avoid wasting resources, the positions of the candidate PDSCHs that may be used for URLLC are distinguished. These positions allow the eMBB transmission when there is no URLLC traffic, but once there is URLLC, these resources are preferentially used.

The positions of the candidate PDSCHs that may be used for URLLC are distinguished in the manners 1) and 2) are classified into one type; and positions of remaining candidate PDSCHs may be classified into one type for transmitting eMBB, The eMBB traffic here is merely an example, and traffic other than URLLC is also feasible. Positions (or a position set) of candidate PDSCHs refer to that if the UE transmits PDSCH traffic in one slot (or one sub-slot), UE selects only one or more PDSCH positions from the positions of the candidate PDSCHs to perform the transmission.

Further, after the traffic preferentially using the candidate PDSCHs is distinguished, HARQ-ACK information is formed next for the candidate PDSCHs. The HARQ-ACK information may be formed in the manners described below.

Manner one: First, all candidate PDSCHs in one slot are divided into large categories according to traffic types; and then, candidate PDSCHs of each large category are divided. The division based on each large category is performed according to the overlapping situation in time domain and end time of each candidate PDSCH.

That is, in the case where positions of all the candidate PDSCHs are in one slot, a semi-static codebook is formed for positions of candidate PDSCHs on which URLLC may be transmitted. A semi-static codebook is formed for positions of remaining candidate PDSCHs in the slot. The sum of semi-static codebooks formed for the positions of the two parts of candidate PDSCHs serves as the size of a semi-static codebook of the positions of all the candidate PDSCHs in the slot. In this way, even if puncturing transmission occurs in the slot, it can be ensured that each of two PDSCHs related to the puncturing transmission in the slot has corresponding HARQ-ACK information.

The same mechanism may be used for forming the semi-static codebook for the positions of the candidate PDSCHs on which URLLC may be transmitted and for forming the semi-static codebook for the positions of the remaining candidate PDSCHs. For example, the mechanism for forming the semi-static codebook for the positions of the candidate PDSCHs on which URLLC may be transmitted may be that: a candidate PDSCH with the earliest end time is found from these positions of the candidate PDSCHs (if there are multiple candidate PDSCHs each with the earliest end time, any one of the multiple candidate PDSCHs is selected), and the earliest candidate PDSCH and a candidate PDSCH having an overlap (including a partial overlap in time domain) with the earliest candidate PDSCH in time domain and having the same type as the earliest candidate PDSCH serve as one group. For this one group, only one piece of HARQ-ACK information may be formed in the semi-static codebook. For the remaining candidate PDSCHs, the group division is still performed according to the preceding rules until all the candidate PDSCHs are processed.

In a slot or sub-slot for transmitting PDSCHs, if an HARQ-ACK codebook of these PDSCHs is indicated to be transmitted on one physical uplink control channel (PUCCH)/physical uplink shared channel (PUSCH) in one slot or one sub-slot, pieces of HARQ-ACK information of candidate PDSCHs with the same type are concatenated in the semi-static codebook according to a time sequence of positions of the candidate PDSCHs.

The formed two parts of semi-static codebooks may be processed in one of the manners described below.

Manner one: The two parts of semi-static codebooks are carried on different PUCCHs for transmission. Optimally, a semi-static codebook of URLLC includes only the semi-static codebook corresponding to the candidate PDSCHs on which URLLC may be transmitted (not including a semi-static codebook corresponding to candidate PDSCHs used by non-URLLC), thereby reducing overheads. However, a semi-static codebook of non-URLLC includes only a semi-static codebook corresponding to candidate PDSCHs other than the candidate PDSCHs on which URLLC may be transmitted (here, may also include the semi-static codebook corresponding to the candidate PDSCHs on which URLLC may be transmitted, to ensure that the positions of the candidate PDSCHs on which URLLC may be transmitted may be used for transmitting non-URLLC traffic), thereby reducing overheads.

Manner two: The two parts of semi-static codebooks are concatenated and carried on one PUCCH/PUSCH for transmission. In the concatenation, the semi-static codebook of URLLC is preferentially placed before the other part of semi-static codebook, so that the reliability of the semi-static codebook of URLLC can be improved and the semi-static codebook of URLLC can be quickly decoded by using the codec principle of polar codes, thereby obtaining more time of data processing.

For manner one, a feedback is required to be made after a semi-static codebook is formed for all the candidate PDSCHs in the slot. For URLLC, a delay of the HARQ-ACK feedback may be generated in some cases. For example, in frequency division duplexing (FDD), a PDSCH of URLLC is transmitted in an earlier symbol of a slot, and then, an HARQ-ACK feedback of the PDSCH may occur in a later symbol of the slot. In this case, a delay of the HARQ-ACK feedback is resulted. This case does not often occur, and there is no problem in time division duplexing (TDD).

For manner two, first, a candidate PDSCH is determined according to the end times of the candidate PDSCHs, and then, corresponding candidate PDSCHs are selected according to the traffic type corresponding to the determined candidate PDSCH to perform a time-domain overlap selection.

That is, for the positions of all the candidate PDSCHs in one slot, the position of a candidate PDSCH with the earliest end time and a candidate PDSCH having an overlap with the earliest candidate PDSCH in time domain and having the same type as the earliest candidate PDSCH are selected and serve as one group. For this one group, one piece of HARQ-ACK information is formed in the semi-static codebook. For the remaining candidate PDSCHs (here referring to the remaining candidate PDSCHs of all types), the group division is still performed according to the preceding rules until all the candidate PDSCHs are processed.

Pieces of HARQ-ACK information of all the candidate PDSCHs in the slot are concatenated in the semi-static codebook according to a time sequence of candidate PDSCH groups (here no matter a group composed of candidate PDSCHs of URLLC or a group composed of candidate PDSCHs of other types).

If there are multiple candidate PDSCHs with the same type in the selection of the candidate PDSCH with the earliest end time, any one of the multiple candidate PDSCHs is selected.

If there are multiple candidate PDSCHs of different types in the selection of the candidate PDSCH with the earliest end time, the following steps are performed on a candidate PDSCH of each type separately: the earliest candidate PDSCH and a candidate PDSCH having an overlap with the earliest candidate PDSCH in time domain and having the same type as the earliest candidate PDSCH serve as one group, and for this one group, one piece of HARQ-ACK information is formed in the semi-static codebook. Preferably, HARQ-ACK information formed for candidate PDSCHs on which URLLC may be transmitted is placed before HARQ-ACK information formed for candidate PDSCHs of another type.

The advantage of manner two is that each type of candidate PDSCHs are grouped separately, and pieces of HARQ-ACK information of all the obtained groups are mixed together and concatenated in the semi-static codebook according to a time sequence, thereby avoiding the delay of an HARQ-ACK feedback.

For manners one and two, the semi-static codebook is formed for the positions of the candidate PDSCHs on which URLLC may be transmitted. A semi-static codebook is formed for the positions of the remaining candidate PDSCHs in the slot. The sum of semi-static codebooks formed for the positions of the two parts of candidate PDSCHs serves as the size of the semi-static codebook of the positions of all the candidate PDSCHs in the slot. In this way, even if puncturing transmission occurs in the slot, it can be ensured that each of two PDSCHs related to the puncturing transmission in the slot has corresponding HARQ-ACK information.

According to the codebook determination method in this embodiment, all candidate PDSCHs in a slot are divided into groups according to candidate PDSCH types and end times of the candidate PDSCHs, a respective piece of HARQ-ACK information is formed for each group of PDSCHs according to the group division situation, and finally, the formed pieces of HARQ-ACK information are concatenated according to a sequence of end times, to obtain a final codebook. The HARQ-ACK information obtained after the concatenation is a definite and complete codebook. In this way, when multiple candidate PDSCHs are configured in the same slot and have an overlap in time domain, it can be ensured that the issue that a part of the candidate PDSCHs are forbidden to be used in puncturing transmission does not occur. Moreover, the codebook determined by the method has a moderate size and the integrity of data transmission can be ensured, thereby improving the use performance of a device.

Further, the candidate PDSCHs are divided according to the priorities of candidate PDSCH types to form the pieces of HARQ-ACK information and the codebook with the corresponding size is obtained, thereby implementing the transmission of two different traffic types in the same slot. This further solve the issue in the related art that no matter any traffic type, as long as there is an overlap in time domain, one of traffic types is selected to form HARQ-ACK information and the remaining is prohibited from being used. In this way, the integrity of traffic transmission is ensured.

Embodiment Two

The codebook determination method in the embodiments of the present disclosure is described in detail below in conjunction with specific application scenarios. A description is given below using an example where there are multiple candidate PDSCHs for both transmission of URLLC traffic and transmission of EMBB traffic in one slot.

Figure 5:
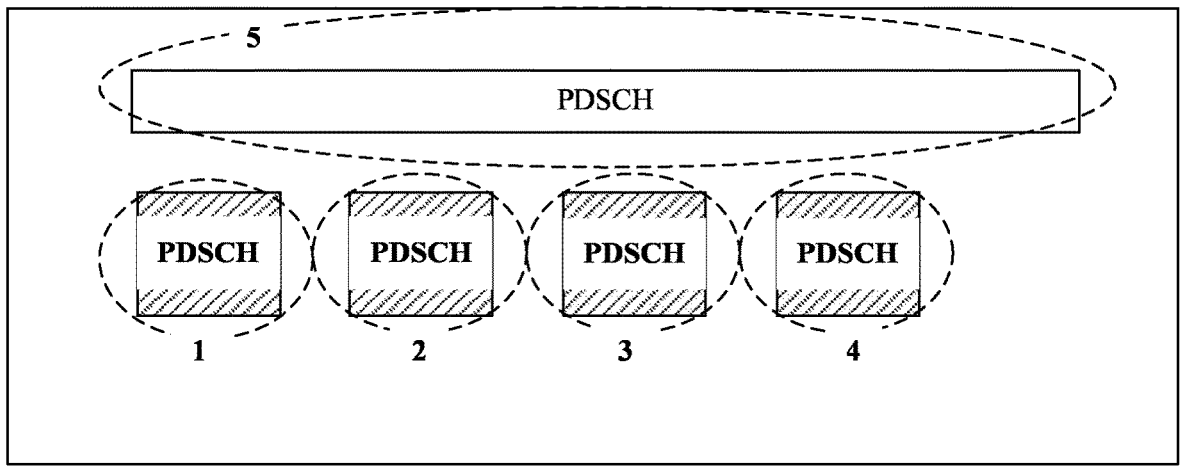
FIG. 5 is a schematic diagram of a first group division of candidate PDSCHs which are in the same slot and have an overlap in time domain according to an embodiment of the present disclosure.

As shown in FIG. 5, in one slot, there are five candidate PDSCHs for implementing transmission of URLLC traffic and transmission of EMBB traffic. There is no overlap among candidate PDSCHs for implementing URLLC traffic in time domain, and there is an overlap between each candidate PDSCH for implementing URLLC traffic and a candidate PDSCH for implementing EMBB traffic separately in time domain. The specific overlapping situation is as shown in FIG. 5.

FIG. 5 illustrates positions of the candidate PDSCHs in the slot. candidate PDSCHs with oblique lines are candidate PDSCHs on which URLLC may be transmitted and serve as one type. The remaining PDSCHs serve as one type. The positions of the candidate PDSCHs are divided into groups in manner one of embodiment one described above, and a codebook is formed for the candidate PDSCHs with oblique lines. candidate PDSCHs in one dashed circle are one group. Since there is no overlap among the candidate PDSCHs with oblique lines in time domain in FIG. 5, the candidate PDSCHs with oblique lines form their respective groups and have their respective pieces of HARQ-ACK information in the semi-static codebook. Assuming that each PDSCH forms 1 bit of HARQ-ACK information, there are 4 bits of HARQ-ACK information. Another type of PDSCH also forms one single group and has 1 bit of HARQ-ACK information. An HARQ-ACK codebook in the slot has a total size of 5 bits. The concatenation of HARQ-ACKs may be that pieces of HARQ-ACK information of PDSCHs with the same type are concatenated according to the generation sequence of dashed circles. Then, in the concatenation of the HARQ-ACKs of different types of PDSCHs, an HARQ-ACK of URLLC is placed ahead. Moreover, a preferred concatenation sequence of the pieces of the HARQ-ACK information may be the numbering sequence of dashed cycles in FIG. 5 (the concatenation sequence is optional).

Further, the positions of candidate PDSCHs in the slot in FIG. 5 may be divided in manner two of embodiment one described above. If HARQ-ACKs of the candidate PDSCHs in FIG. 5 are generated in manner two, the final result is completely the same as that in manner one.

However, the process is that the group division is first performed according to the earliest end time of the positions of the candidate PDSCHs. As in FIG. 5, a candidate PDSCH for implementing the URLLC traffic has the earliest end time, and there is no overlap among the candidate PDSCHs of the URLLC traffic in time domain. Thus, the candidate PDSCHs with oblique lines in FIG. 5 have no overlap in time domain, and thus form their respective groups and have their respective pieces of HARQ-ACK information in a semi-static codebook. Then, the candidate PDSCH for implementing the EMBB traffic forms one group. Finally, in the concatenation of HARQ-ACKs of PDSCHs with different types, the HARQ-ACK of URLLC is placed ahead. Moreover, a preferred concatenation sequence of the pieces of the HARQ-ACK information may be the numbering sequence of dashed cycles in FIG. 5.

Embodiment Three

Figure 6:
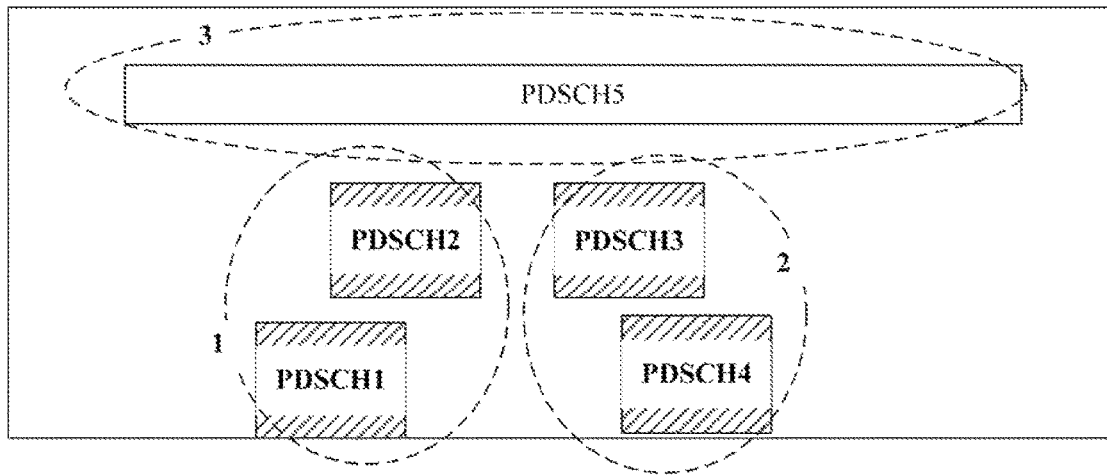
FIG. 6 is a schematic diagram of a second group division of candidate PDSCHs which are in the same slot and have an overlap in time domain according to an embodiment of the present disclosure.

As shown in FIG. 6, in one slot, there are five candidate PDSCHs for implementing transmission of URLLC traffic and transmission of EMBB traffic, respectively. There are overlaps among candidate PDSCHs for implementing URLLC traffic in time domain. Specifically, PDSCH1 overlaps PDSCH2, PDSCH3 overlaps PDSCH4, and PDSCH5 is a single candidate PDSCH for implementing EMBB traffic and having an overlap in time domain. The specific overlapping situation is as shown in FIG. 6.

FIG. 6 illustrates positions of the candidate PDSCHs in the slot. candidate PDSCHs with oblique lines are candidate PDSCHs on which URLLC may be transmitted and serve as one type. The remaining PDSCHs serve as one type. The positions of the candidate PDSCHs are divided into groups in manner one of embodiment one described above. A codebook is formed for the candidate PDSCHs with oblique lines. PDSCH1 is the earliest one to end and is selected first, and PDSCH2 overlaps PDSCH1 in time domain, so PDSCH1 and PDSCH2 are grouped into one group numbered 1. The remaining candidate PDSCHs among the candidate PDSCHs with oblique lines are PDSCH3 and PDSCH4. In this case, PDSCH3 is the earliest one to end, and PDSCH4 overlaps PDSCH3 in time domain, so PDSCH3 and PDSCH4 are grouped into one group numbered 2. PDSCH5 candidate used for non-URLLC is one single group numbered 3, and there is no PDSCH overlapping PDSCH5 in time domain. Thus, the semi-static codebook has a size of 3 bits. Moreover, a preferred concatenation sequence of the pieces of the HARQ-ACK information may be the numbering sequence of dashed cycles in FIG. 6 (the concatenation sequence is optional).

Further, the positions of the candidate PDSCHs in the slot in FIG. 6 may be divided in manner two of embodiment one described above. If HARQ-ACKs of the candidate PDSCHs in FIG. 6 are generated in manner two, the final result is completely the same as that in manner one.

Embodiment Four

Figure 7:
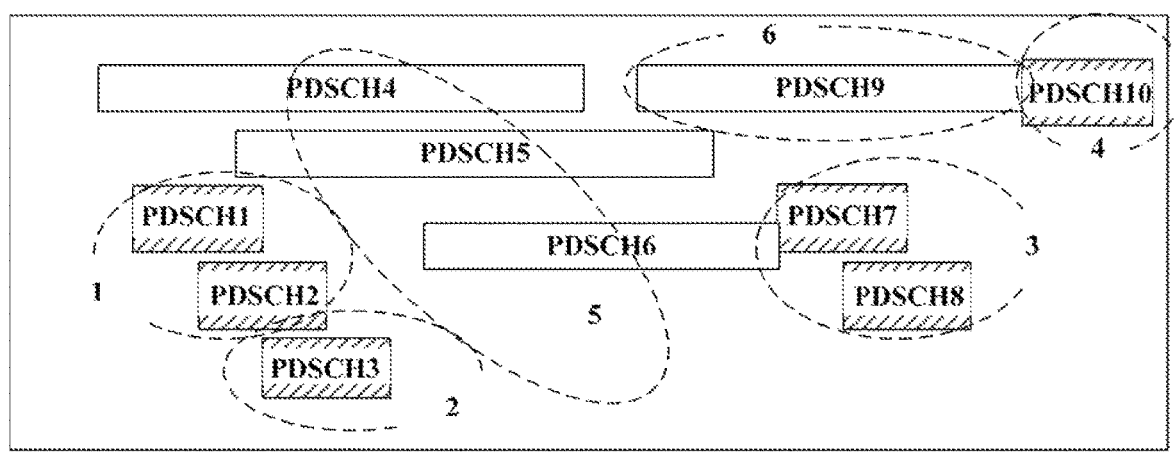
FIG. 7 is a schematic diagram of a third group division of candidate PDSCHs which are in the same slot and have an overlap in time domain according to an embodiment of the present disclosure.

As shown in FIG. 7, in one slot, there are 10 candidate PDSCHs for implementing transmission of URLLC traffic and transmission of EMBB traffic. PDSCH1, PDSCH2, PDSCH3, PDSCH7, PDSCH8 and PDSCH10 serve as one type. PDSCH4, PDSCH5, PDSCH6 and PDSCH9 serve as another type. There are overlaps among candidate PDSCHs for implementing URLLC traffic in time domain. The specific overlapping situation is as shown in FIG. 7.

FIG. 7 illustrates positions of the candidate PDSCHs in the slot. candidate PDSCHs with oblique lines are candidate PDSCHs on which URLLC may be transmitted and serve as one type. The remaining PDSCHs serve as one type. Positions of the candidate PDSCHs are divided into groups in manner one of embodiment one described above, and a codebook is formed for the candidate PDSCHs with oblique lines.

PDSCH1 is the earliest one to end and is selected first, and PDSCH2 overlaps PDSCH1 in time domain, so PDSCH1 and PDSCH2 are divided into one group numbered 1. The remaining candidate PDSCHs among the candidate PDSCHs with oblique lines are PDSCH3, PDSCH7, PDSCH8 and PDSCH10. In this case, PDSCH3 is the earliest one to end and does not overlap the remaining other PDSCHs with oblique lines in time domain, so PDSCH3 is one single group numbered 2. The earliest one to end is selected from the remaining PDSCH7, PDSCH8 and PDSCH10 once again, and PDSCH7 is the earliest one to end and overlaps PDSCH8 in time domain, so PDSCH7 and PDSCH8 serve as one group numbered 3. PDSCH10 does not overlap other PDSCHs with oblique lines in time domain and is one single group numbered 4. For PDSCH5 candidate, PDSCH5 candidate, PDSCH6 candidate and PDSCH9 candidate used for non-URLLC, PDSCH4 is the earliest one to end and is selected, and PDSCH4 overlaps PDSCH5 and PDSCH6 in time domain, so PDSCH4, PDSCH5 and PDSCH6 are grouped into one group numbered 5. Among the remaining PDSCHs used for non-URLLC, PDSCH9 does not overlap other PDSCHs in time domain and is one single group numbered 6. Thus, the semi-static codebook has a size of 6 bits. Moreover, a preferred concatenation sequence of the HARQ-ACK information may be the numbering sequence of dashed cycles in FIG. 7 (the concatenation sequence is optional).

Embodiment Five

As shown in FIG. 7, in one slot, there are 10 candidate PDSCHs for implementing transmission of URLLC traffic and transmission of EMBB traffic. PDSCH1, PDSCH2, PDSCH3, PDSCH7, PDSCH8 and PDSCH10 serve as one type. PDSCH4, PDSCH5, PDSCH6 and PDSCH9 serve as another type. There are overlaps among the candidate PDSCHs for implementing URLLC traffic in time domain. The specific overlapping situation is as shown in FIG. 7.

In this embodiment, for the overlapping situation of the candidate PDSCHs in FIG. 7, positions of the candidate PDSCHs may also be divided into groups in manner two of embodiment one described above. candidate PDSCHs with oblique lines on which URLLC may be transmitted serve as one type. The remaining PDSCHs serve as one type. According to manner two, the semi-static codebook is determined in the manner described below.

Figure 8:
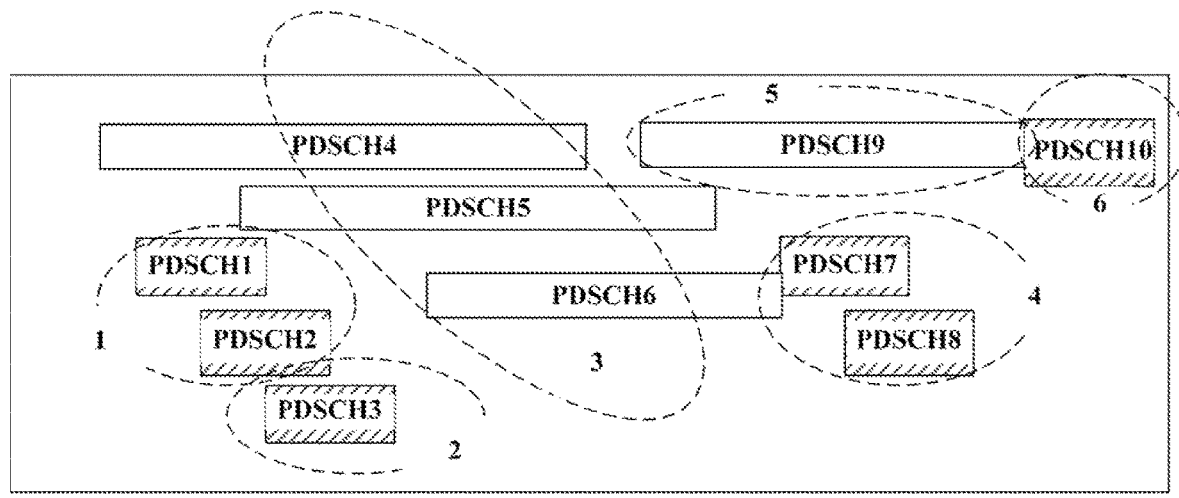
FIG. 8 is a schematic diagram of a fourth group division of candidate PDSCHs which are in the same slot and have an overlap in time domain according to an embodiment of the present disclosure.

The earliest one to end is selected from the positions of all the candidate PDSCHs in the slot. In this case, PDSCH1 is selected, and PDSCH2 overlaps PDSCH1 in time domain and has the same type as PDSCH1, so PDSCH1 and PDSCH2 are one group numbered 1. The earliest one to end is selected again from positions of the remaining candidate PDSCHs in the slot. In this case, PDSCH3 is selected, and there is no PDSCH among the PDSCHs having the same type as PDSCH3 overlaps PDSCH3 in time domain, so PDSCH3 is one single group numbered 2. Then, the earliest one to end is selected again from the remaining PDSCHs. In this case, PDSCH4 is selected, and PDSCH5 and PDSCH6 have the same type as PDSCH4 and overlap PDSCH4 in time domain, so PDSCH4, PDSCH5 and PDSCH6 are one group numbered 3. Then, the earliest one to end is selected again from the remaining PDSCHs. In this case, PDSCH7 is selected, and PDSCH8 has the same type as PDSCH7 and overlaps PDSCH7 in time domain, so PDSCH7 and PDSCH8 are one group numbered 4. Then, the earliest one to end is selected again from the remaining PDSCHs. In this case, PDSCH9 is selected, and there is no PDSCH among the PDSCHs having the same type as PDSCH9 overlaps PDSCH9 in time domain, so PDSCH9 is one single group numbered 5. Then, the earliest one to end is selected again from the remaining PDSCHs again. In this case, PDSCH10 is selected, and there is no PDSCH among the PDSCHs having the same type as PDSCH10 overlaps PDSCH10 in time domain, so PDSCH10 is one single group numbered 6. Thus, the semi-static codebook has a size of 6 bits. Moreover, the concatenation sequence of HARQ-ACK information is the numbering sequence of dashed circles in FIG. 8.

Embodiment Six

In this embodiment, there is another case for overlapping among candidate PDSCHs in the same slot in time domain. That is, there are two candidate PDSCHs for implementing different traffic types have the same end time. In this case, the general manner is that HARQ-ACK information is preferentially formed for a traffic type with a higher priority, as shown in FIG. 9.

Figure 9:
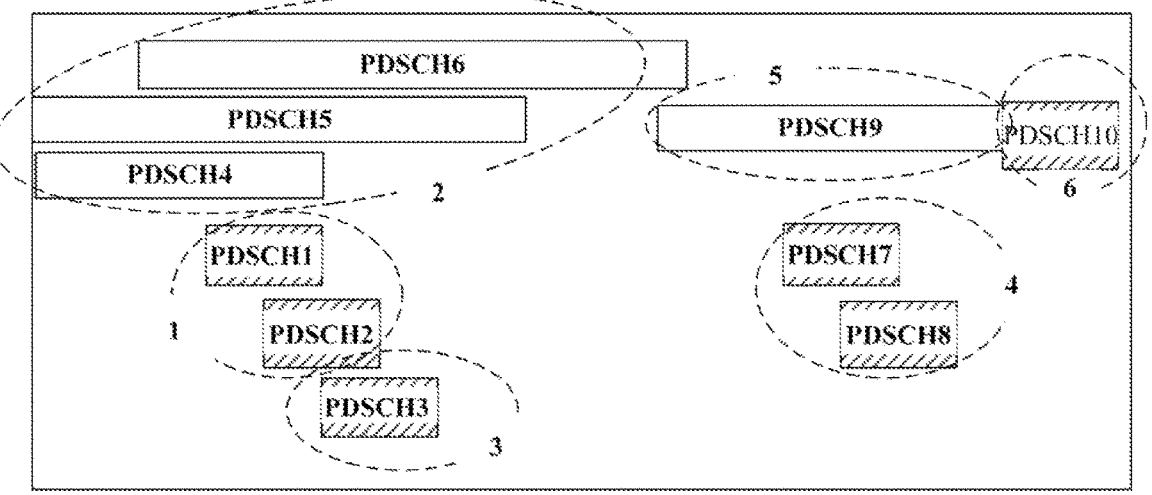
FIG. 9 is a schematic diagram of a fifth group division of candidate PDSCHs which are in the same slot and have an overlap in time domain according to an embodiment of the present disclosure.

In this embodiment, the case in FIG. 9 is processed in manner two of embodiment one. Emphasis is placed on that if there are different types of positions of candidate PDSCHs each having the earliest end position in a selection of the position of a candidate PDSCH having the earliest end position, the processing manner is described below.

In FIG. 9, PDSCH1 and PDSCH4 are positions of candidate PDSCHs for different traffic types. PDSCH1 has a higher priority. That is, PDSCH1 may be used for transmitting URLLC. PDSCH4 is not used for transmitting URLLC. In this way, in the selection of the candidate PDSCH earliest to end, PDSCH1 and PDSCH4 each have the earliest end position. In this case, the position of a candidate PDSCH on which URLLC may be transmitted (that is, PDSCH1) is first selected to form the first piece of HARQ-ACK information. In this case, PDSCH2 overlaps PDSCH1 in time domain and has the same type as PDSCH1, so PDSCH1 and PDSCH2 serve as one group numbered 1. That is, while the candidate PDSCH with a higher priority is selected and preferentially processed, a PDSCH having an overlap in time domain is selected and grouped according to the type of PDSCH1. PDSCH1 and a PDSCH having the same type as PDSCH4 cannot be grouped into the same group. After the group division of PDSCH1 is completed, PDSCHs overlapping PDSCH4 in time domain are selected, and PDSCH5 and PDSCH6 have the same type as PDSCH4 and overlap PDSCH4 in time domain. In this case, PDSCH4, PDSCH5 and PDSCH6 serve as one group numbered 2.

Then, the earliest PDSCH to end is selected from all the remaining candidate PDSCHs. In this case, PDSCH3 is selected, and PDSCH3 does not overlap other PDSCHs with the same type in time domain, so PDSCH3 is one single group numbered 3. The rest can be done in the same manner. Thus, the semi-static codebook has a size of 6 bits. Moreover, the concatenation sequence of the pieces of the HARQ-ACK information is the numbering sequence of dashed cycles in FIG. 9.

In this embodiment, priorities of traffic types may be set according to the actual situation. That is, the priority of EMBB may be set to be higher than the priority of URLLC. In this case, PDSCH4 is preferentially selected and preferentially processed.

Embodiment Seven

Each of preceding embodiments two to six illustrates an example of an HARQ-ACK codebook corresponding to the positions of candidate PDSCHs in one slot or one sub-slot. It is to be added here that in each of embodiments two to four, HARQ-ACK codebooks formed for positions of candidate PDSCHs of non-URLLC may be numbered independently. That is, dashed circles of the positions of the candidate PDSCHs of non-URLLC are also numbered from 1. In this way, the HARQ-ACK codebooks of the positions of the candidate PDSCHs of non-URLLC are transmitted independently.

In actual application, it is possible to process candidate PDSCHs in multiple slots. If among the multiple slots or the multiple sub-slots, the positions where candidate PDSCHs are located in each slot are the same, then in the forming of an HARQ-ACK codebook, the processing manner of each of embodiments two to four may be first used. That is, an HARQ-ACK codebook may be formed for the position of a candidate PDSCH on which URLLC may be transmitted in each slot, and then, for the positions of candidate PDSCHs that may be used for URLLC in the multiple slots, bits of pieces of HARQ-ACK information are concatenated according to a time sequence. The positions of candidate PDSCHs that may be used for non-URLLC are processed in the similar manner. In this way, the HARQ-ACK codebooks in the transmission of PDSCHs in the multiple slots are formed. Two types of HARQ-ACK codebooks may be transmitted on their respective PUCCHs.

However, if the two types of HARQ-ACK codebooks are indicated to be transmitted on one PUCCH or one PUSCH, then the HARQ-ACK codebook corresponding to URLLC is concatenated before the other HARQ-ACK codebook. Each of embodiments five and six illustrates a concatenation sequence of HARQ-ACKs of positions of candidate PDSCHs in one slot. In the case where pieces of HARQ-ACK information of PDSCHs in multiple slots are fed back on one PUCCH/PUSCH, pieces of HARQ-ACK information corresponding to positions of candidate PDSCHs in each slot are concatenated according to the HARQ-ACK sequence in each of embodiments one to four.

Generally, in the two manners of the embodiments described above, among the positions of all the candidate PDSCHs, a semi-static codebook is formed for the positions of the candidate PDSCHs on which URLLC may be transmitted, and a semi-static codebook is formed for the positions of the remaining candidate PDSCHs in the slot. The sum of the semi-static codebooks formed for the positions of the two parts of candidate PDSCHs serves as the size of a semi-static codebook of the positions of all the candidate PDSCHs.

The two parts of HARQ-ACK codebooks may be transmitted separately, or may be concatenated and transmitted. The concatenation manner is concatenating the HARQ-ACK codebook corresponding to URLLC before the other HARQ-ACK codebook.

Among the positions of all the candidate PDSCH, for positions of candidate PDSCHs that may be used for URLLC, an URLLC PDSCH with the earliest end position is found in the slots (if there are multiple PDSCHs each with the earliest end position, any one of the multiple PDSCHs is selected), and other URLLC PDSCHs overlapping the URLLC PDSCH in the time domain are found, to form one piece of HARQ-ACK information in the HARQ-ACK codebook. Then, an URLLC PDSCH with the earliest end position is found from the remaining URLLC PDSCHs, and other URLLC PDSCHs overlapping the URLLC PDSCH in time domain are also found, to form one piece of HARQ-ACK information in the HARQ-ACK codebook. The rest can be done in the same manner until the URLLC PDSCHs are processed.

For the positions of all the candidate PDSCHs, the position of a candidate PDSCH with the earliest end time is selected (if there are positions of multiple candidate PDSCHs each with the earliest end time, in the case where the multiple candidate PDSCHs belong to the same type, the processing is performed according to the preceding paragraph; and in the case where the multiple candidate PDSCHs belong to different types, an URLLC PDSCH is first processed, then other PDSCHs are processed, and HARQ-ACK information of the first processed PDSCH is placed before HARQ-ACK information of the later processed PDSCHs). The earliest candidate PDSCH and a candidate PDSCH having an overlap with the earliest candidate PDSCH in time domain and having the same type as the earliest candidate PDSCH serve as one group. For the one group, one piece of HARQ-ACK information is formed in the semi-static codebook. For the remaining candidate PDSCHs (here referring to remaining candidate PDSCHs of all types), the group division is still performed according to the preceding rules until all the candidate PDSCHs are processed. If the positions of all the candidate PDSCHs are in multiple slots, similar processing is performed in each slot, and then, the concatenation is performed in each slot according to a time sequence to form the semi-static codebook.

In the codebook determination method provided by this embodiment of the present disclosure, there is no limitation to the number of bits constituting the codebook. However, in practical application, there may be a limitation to the size of a codebook transmitted in each slot. In this case, parameter K is introduced in this embodiment of the present disclosure to solve the issue of the limitation to the size. The implementation is described below.

Parameter K is introduced. The value of K describes the size of a semi-static codebook associated with URLLC traffic and fed back by a UE on one PUCCH or one PUSCH in one slot or one sub-slot. For example, assuming that each PDSCH feeds back n bits of HARQ-ACK information, M/n HARQ-ACK feedbacks of PDSCHs of URLLC are supported in the slot or the sub-slot. That is, K is constant for the semi-static codebook for URLLC in the slot or the sub-slot.

In this way, if it is necessary to determine the total size of the semi-static codebook in the slot or the sub-slot, then the size of the semi-static codebook is determined according to the related art, and then, K is added and the sum is recorded as the total size of the semi-static codebook.

The sub-slot refers to that symbols in one slot are divided into multiple sub-slots, and each sub-slot contains consecutive symbols.

When a UE needs to feed back a semi-static codebook associated with URLLC traffic and having a size exceeding K in one slot or one sub-slot, corresponding positions of candidate PDSCHs on which URLLC may be transmitted are sequentially divided into K groups, and HARQ-ACKs of PDSCHs in each group are bundled into n bits.

The value of K may be configured through an RRC message, MAC CE signaling or physical layer signaling. It is also feasible to configure a value set of K through an RRC message and select a value from the value set configured through MAC CE signaling or physical layer signaling.

Embodiment Eight

Figure 4:
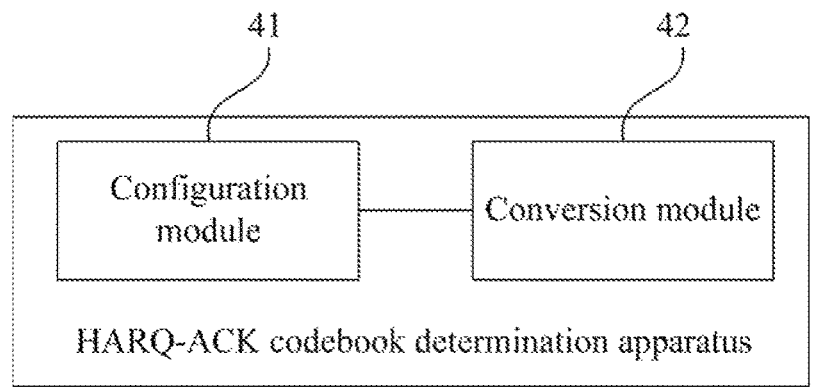
FIG. 4 is a structural diagram of a codebook determination apparatus according to an embodiment of the present disclosure.

This embodiment provides an HARQ-ACK codebook determination apparatus. The apparatus may be applied in various base stations or terminals. Referring to FIG. 4, the apparatus includes a configuration module 41 and a conversion module 42. The configuration module 41 is configured to divide candidate PDSCHs in at least one slot into groups according to candidate PDSCH types and end times of the candidate PDSCHs, and form pieces of HARQ-ACK information corresponding to the divided candidate PDSCHs. The conversion module 42 is configured to concatenate the pieces of HARQ-ACK information corresponding to the candidate PDSCHs to obtain a codebook.

In this embodiment, before the configuration module 41 divides the PSDCH candidates into the groups, the configuration module 41 is further configured to classify traffic types of the candidate PDSCHs in the slot. Specifically, all the candidate PDSCHs in the at least one slot may be determined in one of the manners described below.

1. The candidate PDSCH types are determined by identifying configuration signaling of each candidate PDSCH in the slot, where the configuration signaling includes an RRC message or parameter information in DCI.

The manner of the configuration signaling may include one of the following manners: a separate set of positions of possible candidate PDSCHs are configured for URLLC traffic through an RRC message; a parameter is used for indicating which positions of candidate PDSCHs in the set of positions of candidate PDSCHs are positions of candidate PDSCHs on which URLLC may be transmitted.

However, in practical application, in the set of possible candidate PDSCHs of URLLC, if URLLC is not transmitted, the candidate PDSCHs may be used for transmitting eMBB. Generally, an RRC message or a DCI parameter indicates that the configured candidate PDSCHs are preferentially used for URLLC traffic.

2. The candidate PDSCH types are determined by identifying the number of consecutive symbols occupied by each candidate PDSCH in the slot.

The distinguishing is performed according to agreed numbers of consecutive symbols. That is, the position of each candidate PDSCH with M consecutive symbols or less than M consecutive symbols is regarded as a PDSCH position on which URLLC may be transmitted and should be considered in the forming of a semi-static codebook. M may have different values according to different subcarrier spacings. For example, when the subcarrier spacing is 15 KHz, M is 2; when the subcarrier spacing is 30 KHz, M is 4; when the subcarrier spacing is 60 KHz, M is 8. The values given here are merely possible values. Actually, the values may be different from the values given here, but need to be agreed values. Similarly, to avoid wasting resources, the positions of the candidate PDSCHs that may be used for URLLC are distinguished, and these positions allow the eMBB transmission when there is no URLLC traffic, but once there is URLLC, these resources are preferentially used.

In this embodiment, for the steps and specific processes implemented by each module in the apparatus, reference may be made to the codebook determination processes illustrated in the embodiments described above, which are not repeated here.

According to the apparatus in this embodiment, all candidate PDSCHs in a slot are divided into groups according to candidate PDSCH types and end times of the candidate PDSCHs, a corresponding piece of HARQ-ACK information is formed for each group of PDSCHs according to the group division situation, and finally, the formed pieces of HARQ-ACK information are concatenated according to a sequence of end times, to obtain a final codebook. The HARQ-ACK information obtained after the concatenation is a definite and complete codebook. In this way, when multiple candidate PDSCHs are configured in the same slot and have an overlap in time domain, it can be ensured that the issue that a part of the candidate PDSCHs are forbidden to be used in puncturing transmission does not occur. Moreover, the codebook determined by the method has a moderate size and the integrity of data transmission can be ensured, thereby improving the use performance of a device.

Embodiment Nine

Figure 10:
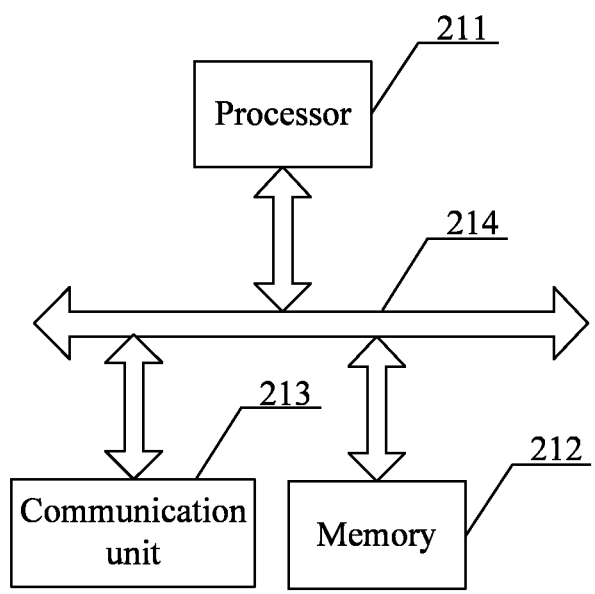
FIG. 10 is a structural diagram of a communication device according to an embodiment of the present disclosure.

This embodiment provides a terminal. Referring to FIG. 10, the terminal includes a processor 211, a memory 212, a communication unit 213 and a communication bus 214.

The communication bus 214 is configured to implement communication connection between the processor 2111, the communication unit 213 and the memory 212.

In an example, the processor 211 is configured to execute one or more programs stored in the memory, to implement the HARQ-ACK codebook determination methods in the embodiments described above. For the specific implementation process of each step, reference is made to the embodiments described above, which are not repeated here.

This embodiment further provides a computer-readable storage medium. The computer-readable storage medium includes volatile or nonvolatile, and removable or non-removable media implemented in any method or technology for storage of information (such as computer-readable instructions, data structures, computer program modules or other data). The computer-readable storage medium includes, but is not limited to, a random access memory (RAM), a read-only memory (ROM), an electrically erasable programmable read only memory (EEPROM), a flash memory or another memory technology, a compact disc read-only memory (CD-ROM), a digital versatile disc (DVD) or another optical disc storage, a magnetic cassette, a magnetic tape, disk storage or another magnetic storage apparatus, or any other medium that can be used for storing desired information and that can be accessed by a computer.

In an example, the computer-readable storage medium in this embodiment may be configured to store one or more first computer programs. The one or more first computer programs are executable by one or more processors to implement the HARQ-ACK codebook determination methods in the embodiments described above.

This embodiment further provides a computer program (or computer software). The computer program may be distributed on a computer-readable medium and executed by a computing device to implement at least one step of the HARQ-ACK codebook determination methods in the embodiments described above. Moreover, in some cases, the at least one step illustrated or described may be performed in a sequence different from those described in the embodiments described above.

This embodiment further provides a computer program product. The computer program product includes a computer-readable apparatus. The preceding computer program is stored on the computer-readable apparatus. The computer-readable apparatus in this embodiment may include the computer-readable storage medium illustrated above.

It can be seen that those having ordinary skill in the art should understand that functional modules/units in the system, the apparatus, and all or part of the steps of the method disclosed above may be implemented as software (which may be implemented by computer program codes executable by a computing apparatus), firmware, hardware and appropriate combinations thereof. In the hardware implementation, the division of the function modules/units described above may not correspond to the division of physical components. For example, one physical component may have multiple functions, or one function or step may be performed jointly by several physical components. Some or all physical components may be implemented as software executed by a processor such as a central processing unit, a digital signal processor or a microprocessor, may be implemented as hardware, or may be implemented as integrated circuits such as application-specific integrated circuits.

Additionally, as is known to those having ordinary skill in the art, communication media generally include computer-readable instructions, data structures, computer program modules, or other data in carriers or in modulated data signals transported in other transport mechanisms and may include any information delivery medium. Therefore, the present application is not limited to any particular combination of hardware and software.

The above is a more detailed description of the embodiments of the present disclosure in conjunction with implementations and is not to be construed as limiting the embodiments of the present application. For those having ordinary skill in the art to which the present application pertains, simple deductions or substitutions may be made without departing from the concept of the present application and are considered to fall within the scope of the present application.

What is claimed is:

1. A hybrid automatic repeat request-acknowledgement (HARQ-ACK) codebook determination method, comprising:
   determining a plurality of candidate physical downlink shared channels (PDSCHs) in a slot to be a plurality of subgroups according to candidate PDSCH types and end of the plurality of candidate PDSCHs, and determining a piece of HARQ-ACK information corresponding to each of the plurality of subgroups; and
   determining an HARQ-ACK codebook by concatenating pieces of HARQ-ACK information corresponding to the plurality of subgroups;
   wherein determining the plurality of candidate PDSCHs in the slot to be the plurality of subgroups according to the candidate PDSCH types and the end of the plurality of candidate PDSCHs, and determining the piece of HARQ-ACK information corresponding to each of the plurality of subgroups comprises:
   determining all the plurality of candidate PDSCHs to be at least two candidate PDSCH sets according to the candidate PDSCH types; and
   determining candidate PDSCHs in each of the at least two candidate PDSCH sets to be subgroups according to a sequence of end of the candidate PDSCHs in the each of the at least two candidate PDSCH sets, and determining a piece of HARQ-ACK information corresponding to each of the subgroups.

2. The method of claim 1, wherein determining the candidate PDSCHs in each of the at least two candidate PDSCH sets to be the subgroups according to the sequence of end of the candidate PDSCHs in the each of the at least two candidate PDSCH sets comprises:
   determining a first candidate PDSCH with an earliest end time from one of the at least two candidate PDSCH sets corresponding to a same candidate PDSCH type;
   determining, from remaining candidate PDSCHs in the one of the at least two candidate PDSCH sets, a second candidate PDSCH having an overlap with the first candidate PDSCH in time domain; and
   grouping the first candidate PDSCH and the second candidate PDSCH into one subgroup.

3. The method of claim 1, wherein determining the plurality of candidate PDSCHs in the slot to be the plurality of subgroups according to the candidate PDSCH types and the end of the plurality of candidate PDSCHs, and determining the piece of HARQ-ACK information corresponding to each of the plurality of subgroups comprises:
   determining a third candidate PDSCH with an earliest end time from the plurality of candidate PDSCHs in the slot;
   determining a candidate PDSCH type of the third candidate PDSCH;
   determining, from other candidate PDSCHs corresponding to the candidate PDSCH type, a fourth candidate PDSCH having an overlap with the third candidate PDSCH in time domain; and
   grouping the third candidate PDSCH and the fourth candidate PDSCH into one subgroup.

4. The method of claim 3, wherein in a case where at least two third candidate PDSCHs each with the earliest end time are determined from the plurality of candidate PDSCHs in the slot, determining the plurality of candidate PDSCHs in the slot to be the plurality of subgroups according to the candidate PDSCH types and the end of the plurality of candidate PDSCHs, and determining the piece of HARQ-ACK information corresponding to each of the plurality of subgroups further comprises:
   sequencing the at least two third candidate PDSCHs according to priorities of candidate PDSCH types of the at least two third candidate PDSCHs, and selecting, from the sequenced at least two third candidate PDSCHs, one candidate PDSCH with a higher priority as an actual third candidate PDSCH.

5. The method of claim 1, wherein determining the plurality of candidate PDSCHs in the slot to be the plurality of subgroups according to the candidate PDSCH types and the end of the plurality of candidate PDSCHs, and determining the piece of HARQ-ACK information corresponding to each of the plurality of subgroups comprises:
   determining a priority of each candidate PDSCH in each slot according to traffic transmitted by the candidate PDSCH types; and determining pieces of HARQ-ACK information for candidate PDSCHs in each priority in the following manner:
  selecting, from candidate PDSCHs with a same priority, a candidate PDSCH with an earliest end time as a fifth candidate PDSCH;
  determining, from remaining candidate PDSCHs among the candidate PDSCHs with the same priority, a sixth candidate PDSCH having an overlap with the fifth candidate PDSCH in time domain; and
  grouping the fifth candidate PDSCH and the sixth candidate PDSCH into one subgroup, and determining a piece of HARQ-ACK information corresponding to the one subgroup.

6. The method of claim 1, wherein determining the HARQ-ACK codebook by concatenating the pieces of HARQ-ACK information corresponding to the plurality of subgroups comprises:
  determining the HARQ-ACK codebook by sequentially concatenating, according to a sequence of priorities of the candidate PDSCH types, HARQ-ACKs of all candidate PDSCHs with a higher priority before HARQ-ACKs of all candidate PDSCHs with a lower priority; or
  determining the HARQ-ACK codebook by sequentially concatenating, according to a sequence of priorities of the candidate PDSCH types, HARQ-ACKs of all candidate PDSCHs in each slot from high to low priority, and concatenating, according to a time sequence of each slot, the concatenated HARQ-ACKs,
  wherein HARQ-ACKs of candidate PDSCHs with a same type are concatenated according to a generation sequence of the plurality of subgroups; or
  determining HARQ-ACKs for each of the at least two candidate PDSCH sets by sequentially concatenating HARQ-ACKs corresponding to all of subgroups in each of the at least two candidate PDSCH sets, according to a generation sequence of the subgroups in each of the at least two candidate PDSCH sets, and determining the HARQ-ACK codebook by sequentially concatenating concatenated HARQ-ACKs corresponding to all of the at least two candidate PDSCH sets.

7. The method of claim 1, further comprising:
determining the candidate PDSCH types according to configuration signaling of each of the plurality of candidate PDSCHs in the slot; or
determining the candidate PDSCH types according to a number of consecutive symbols occupied by each of the plurality of candidate PDSCHs in the slot.

8. The method of claim 7, wherein the configuration signaling comprises a radio resource control (RRC) message or parameter information in downlink control information (DCI).

9. A terminal, comprising a processor, a memory, a communication unit and a communication bus; wherein
  the communication bus is configured to implement radio communication connection between the processor, the communication unit and the memory; and
  the processor is configured to execute at least one program stored in the memory, to implement the hybrid automatic repeat request-acknowledgement (HARQ-ACK) codebook determination method of claim 1.

10. A non-transitory computer-readable storage medium, storing at least one computer program, wherein the at least one computer program is executable by at least one processor to implement the hybrid automatic repeat request-acknowledgement (HARQ-ACK) codebook determination method of claim 1.

11. A hybrid automatic repeat request-acknowledgement (HARQ-ACK) codebook determination apparatus, comprising:
  a memory;
  a processor and configured to implement:
  a configuration module, which is configured to determine a plurality of candidate physical downlink shared channels (PDSCHs) in a slot to be a plurality of subgroups according to candidate PDSCH types and end of the plurality of candidate PDSCHs, and determine a piece of HARQ-ACK information corresponding to each of the plurality of subgroups; and
  a conversion module, which is configured to determine an HARQ-ACK codebook by concatenating pieces of HARQ-ACK information corresponding to the plurality of subgroups,
  wherein the configuration module is configured to determine all the plurality of candidate PDSCHs to be at least two candidate PDSCH sets according to the candidate PDSCH types; and determine candidate PDSCHs in each of the at least two candidate PDSCH sets to be subgroups according to a sequence of end of the candidate PDSCHs in the each of the at least two candidate PDSCH sets, and determine a piece of HIARQ-ACK information corresponding to each of the subgroups.

\* \* \* \* \*